Nov. 11, 1924.  
H. O. SIEGMUND  
ASYMMETRIC CELL ANODE  
Filed May 11, 1921  
1,514,736
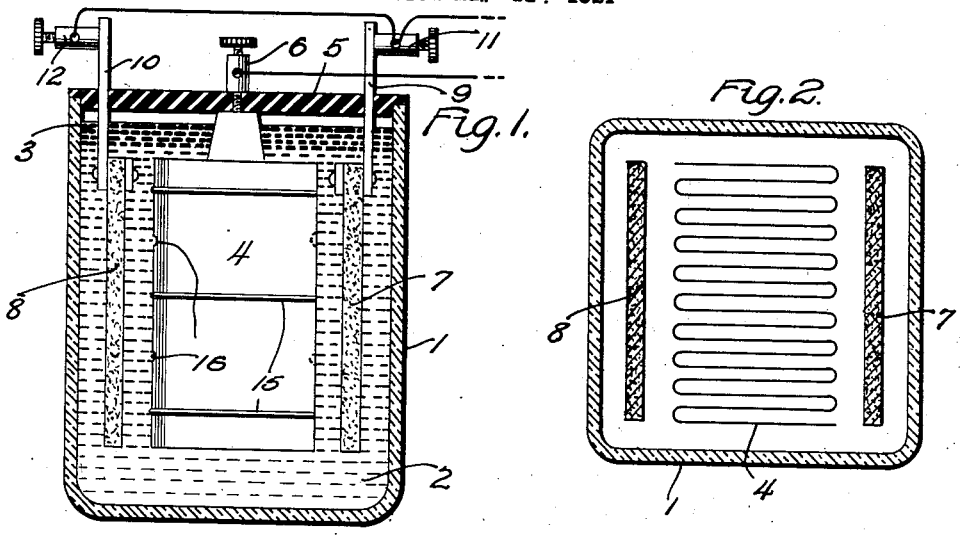
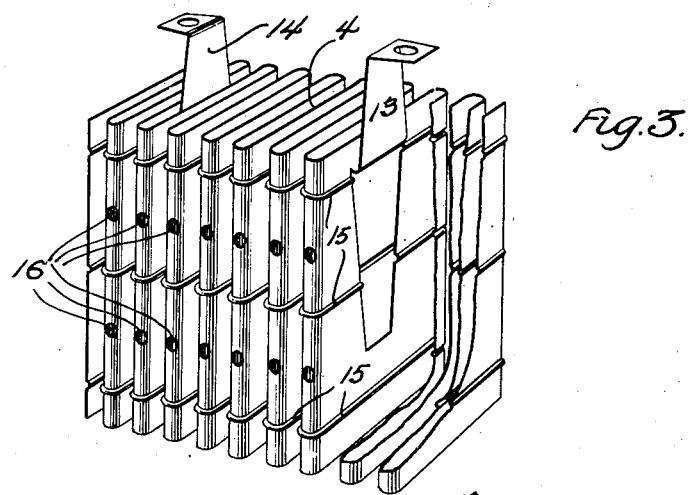
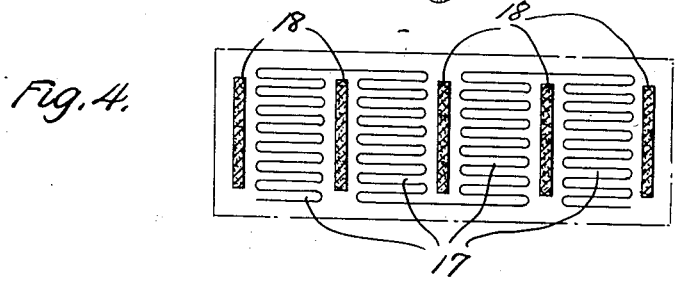
Inventor:  
Humphreys O. Siegmund  
by Joel Ch. Palmer  
Att'y Patented Nov. 11, 1924.

1,514,736

UNITED STATES PATENT OFFICE.

HUMPHREYS O. SIEGMUND, OF SPRINGFIELD, NEW JERSEY, ASSIGNOR TO WESTERN ELECTRIC COMPANY, INCORPORATED, OF NEW YORK, N. Y., A CORPORATION OF NEW YORK.

ASYMMETRIC-CELL ANODE.

Application filed May 11, 1921. Serial No. 468,583.

*To all whom it may concern:*

Be it known that I, HUMPHREYS O. SIEGMUND, a citizen of the United States, residing at Springfield, in the county of Union, State of New Jersey, have invented certain new and useful Improvements in Asymmetric-Cell Anodes, of which the following is a full, clear, concise, and exact description.

This invention pertains to electrolytic cells and particularly to that type known as asymmetric cells and to an anode structure therefor.

The object of the invention is to provide an anode that is simple to manufacture and that gives high efficiency in service.

This invention provides an anode structure formed from a single flat sheet of material crimped lengthwise to add stiffness and bent into the form of a recurring letter S. Perforations are made in this structure to aid proper circulation of electrolyte and to reduce the internal resistance of the cell. Ears, integral with the structure at the attached edge, are bent to form supporting members for the anode.

These and other novel features will be more clearly understood from the accompanying illustrative drawings and detailed description, wherein Figure 1 is a side sectional view of a cell of this invention disclosing the various parts in their proper relative positions. Figure 2 is a top view of the assembled cell showing particularly the proper relative position of anode and cathode structures. Figure 3 is a perspective view of one form of the anode structure showing a portion cut away to disclose the method of forming one of the supporting ears. Figure 4 is a top view of a cell employing the equivalent of several units such as disclosed in Figure 2 but having the anode structure formed of a continuous sheet.

Referring to Figure 1 in detail, there is disclosed a cell casing 1 containing a suitable electrolyte 2 having a layer of oil 3 or similar evaporation preventing liquid on its exposed surface. Suspended in the electrolyte is an anode 4 of film-forming material which is suspended from a cell cover 5 made of insulating material, the anode being attached to this cover by terminal binding posts 6. Cathode plates 7 and 8 made of insoluble non-film-forming material such as carbon are suspended in proximity to the anode 4 by terminal rods 9 and 10 to which are attached binding posts 11 and 12.

In detail, Figure 2 discloses the corrugated structure of an anode 4 as suspended in the cell 1 and the proper relation of cathode plates 7 and 8 to the anode 4.

Figure 3 discloses an anode structure 4 which may be made from a single continuous sheet of film-forming material, such as aluminum, by first punching out the ears 13 and 14 which may be bent up into the position shown to form retaining means for the anode when assembled in the cell and secondly, rolling the crimps 15 which are used for making the finished structure more rigid; next punching the holes 16 to allow good circulation of the electrolyte through the anode structure when assembled in a cell and to reduce the internal resistance of the cell, and lastly, folding this punched plate into the corrugated form disclosed in which condition it presents a large amount of surface for electrolytic action and yet is extremely compact. In addition to these features, the plate possesses the advantage of having no mechanical joints at which corrosion may occur below the surface of the electrolyte, inasmuch as the plate is held in place wholly by the ears 13 and 14 which extend upwardly and form joints with the terminals 6 above the surface of the electrolyte.

Figure 4 discloses in detail a somewhat different arrangement of cell assembly in which a plurality of corrugated anode units, such as disclosed in Figure 3, are connected so as to form a single continuous anode 17. This anode may be formed in precisely the same manner as that described in connection with Figure 3 by using a sheet of film-forming material of the appropriate length and constructing the anode units as disclosed in Figure 3 at various points in the length of this sheet. A plurality of cathode elements 18 of non-film-forming material are provided in such positions relative to the anode structure 17 that the free circulation of the electrolyte is secured and the internal resistance of the cell reduced to a minimum. The arrangement of Figure 4 may be used where exceptionally large capacity is required.

What is claimed is:

1. An electrode for electrolytic condensers consisting of a sheet of film-forming material bent into the form of a recurring letter S, and having integral supporting ears extending upwardly therefrom.

2. In an electrolytic cell, an electrode, and a sheet of film forming material bent into the form of a recurring letter S and having integral supporting ears thereon which extend above the surface of the electrolyte.

3. An asymmetric cell anode comprising a perforated sheet of aluminum having lateral crimps therein, bent into the form of a recurring letter "S", and having integral supporting ears projecting therefrom.

4. An asymmetric cell comprising an inactive casing, an electrolyte, an anode consisting of a corrugated and ribbed sheet of film-forming material, said anode attached to the cell top by ears integral with the anode and cathode plates of non-film-forming material attached to said cell top in proximity to said anode.

5. An asymmetric cell comprising an inactive casing, an electrolyte, a plurality of cathodes and an anode consisting of a ribbed and perforated sheet of film forming material, bent to form a recurring letter "S" between each pair of adjacent cathodes, said anode being supported by means of ears integral therewith and attached to the top of the cell.

In witness whereof, I hereunto subscribe my name this 10th day of May A. D., 1921.

HUMPHREYS O. SIEGMUND.